(12) United States Patent
Chaudhari et al.

(10) Patent No.: US 7,214,639 B2
(45) Date of Patent: May 8, 2007

(54) IMMOBILIZED METAL COMPLEX CATALYSTS, PROCESS FOR PREPARATION THEREOF AND USE THEREOF

(75) Inventors: Raghunath Vitthal Chaudhari, Maharashtra (IN); Bibhas Ranjan Sarkar, Maharashtra (IN); Kausik Mukhopadhyay, Maharashtra (IN)

(73) Assignee: Council of Scientific and Industrial Research, New Delhi (IN)

( * ) Notice: Subject to any disclaimer, the term of this patent is extended or adjusted under 35 U.S.C. 154(b) by 91 days.

(21) Appl. No.: 10/731,446

(22) Filed: Dec. 10, 2003

(65) Prior Publication Data
US 2005/0131252 A1 Jun. 16, 2005

(51) Int. Cl.
*B01J 31/28* (2006.01)
*B01J 31/24* (2006.01)
*B01J 31/18* (2006.01)

(52) U.S. Cl. ............... 502/150; 502/155; 502/158; 502/167

(58) Field of Classification Search .......... 502/158, 502/159, 166–168, 150, 170, 439, 523, 527.11, 502/527.18, 527.19, 527.23, 527.29, 527.16, 502/527.17
See application file for complete search history.

(56) References Cited

U.S. PATENT DOCUMENTS

| | | | | |
|---|---|---|---|---|
| 4,394,294 A | * | 7/1983 | Gryaznov et al. | 502/158 |
| 4,960,745 A | * | 10/1990 | Johnson | 502/150 |
| 6,040,261 A | * | 3/2000 | Hlatky | 502/117 |
| 6,069,253 A | * | 5/2000 | Chaudhari et al. | 546/2 |
| 6,100,214 A | * | 8/2000 | Walzer et al. | 502/159 |
| 6,113,722 A | * | 9/2000 | Hoffman et al. | 156/155 |
| 6,251,280 B1 | * | 6/2001 | Dai et al. | 210/656 |
| 6,294,687 B1 | * | 9/2001 | Chaudhari et al. | 560/114 |
| 6,908,877 B2 | * | 6/2005 | Shin et al. | 502/152 |
| 2003/0054948 A1 | * | 3/2003 | Pinnavaia et al. | 502/158 |
| 2005/0113622 A1 | * | 5/2005 | Drent et al. | 585/521 |

FOREIGN PATENT DOCUMENTS

JP 1085141 * 3/1989
WO WO 02/094841 A1 * 11/2002

OTHER PUBLICATIONS

T. Jackson et al., Green Chem., 2004, vol. 6, pp. 193-195.*
B. Pugin et al., Heterogeneous Catalysis and Fine Chemicals III, M. Guisnet et al. eds., Elsevier, 1993, pp. 107-114.*
F. Babonneau et al., Mater. Res. Soc. Symp. Proc., 519 (1998), pp. 363-368, abstract 055.*
D. Weaver et al., Abstr. Pap. Am. Chem. Soc., Aug. 23, 1998, "Palladium-grafted mesoporous materials for Heck catalysis", abstract 196.*

* cited by examiner

*Primary Examiner*—David Sample
(74) *Attorney, Agent, or Firm*—Nixon & Vanderhye P.C.

(57) ABSTRACT

The present invention provides a novel immobilized metal complex catalyst of the formula I Formula 1 wherein M is a Group VIII metal, n is an integer with a value between 2 and 6, $ML_x$ is an organometallic complex.

9 Claims, No Drawings

IMMOBILIZED METAL COMPLEX CATALYSTS, PROCESS FOR PREPARATION THEREOF AND USE THEREOF

FIELD OF THE INVENTION

The present invention relates to a novel immobilized metal complex catalyst of the formula I

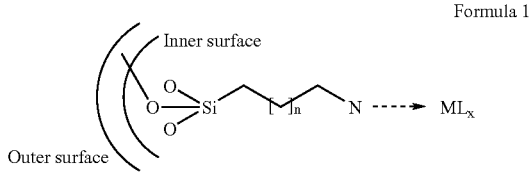

Formula 1 wherein M is a Group VIII metal, n is an integer with a value between 2 and 6, $ML_x$ is an organometallic complex.

The present invention also provides a process for the preparation of a novel immobilized metal complex catalyst and use thereof for carbonization reactions. More particularly the present invention relates to the preparation of immobilized transition metal complex catalyst having a general representation as in formula I above, wherein the organometallic complex $ML_x$ is anchored to the internal surface of the solid matrix by an anchoring agent of Formula VI

Formula VI wherein Z is a functional group as —$NH_2$, —SH, vinyl, allyl etc., "n" may have integral values between 2 and 6, "m" may have integral values between 1 and 3.

The catalysts thus prepared are solid, robust and heterogeneous and hence, separable from the reaction mixture by simple filtration techniques and are therefore recyclable catalysts for carbonylation of aryl-olefins, alcohols, substituted alkyl halides etc., optionally in presence of an alkali metal halide and organic acid as promoters. Specifically, the hydroxycarbonylation of the aryl-olefins and alcohols yields selectively the branched carboxylic acids, which are representatives of a class of non-steroidal anti-inflammatory drugs. These easy separable catalysts along with their higher performance in comparison to those in the existing art, with respect to those in the existing art, with respect to the resolvability and the leaching of the metal into the reaction mixture, mark the adorable advantages of the invention.

BACKGROUND OF THE INVENTION

Aryl and aliphatic carboxylic acids have a variety a variety of applications in industries as anti-inflammatory drugs, fine chemicals, etc. the prior art describes the catalyst systems for employment in the processes for the preparation of carboxylic acids using the carbonization reaction on a variety of substrates. So for the most preferred catalyst system has been the homogeneous transition metal catalysts, typically palladium complexes. Generally, the various catalyst systems used for the hydrocarboxylation of olefins and comprises of a palladium source, a phosphine ligand, and a hydrogen halide promoter. Reference can made of Bittler et al. (Angew. Chem. Int. Eng. Ed., 7, 1968, 329), who described the hydrocarboxylation of olefins using a catalyst system comprising of palladium source as $PdCl_2$ or $PdCl_2(PPh_3)_2$, a ligand as triphenylphosphine ($PPh_3$) and HCl, has been found to occur only under drastic conditions such as 300 to 700 atm of carbon monoxide pressure. Oi et al (J. Mol. Catal. A: Chem., 115, 1997, 289) have reported hydroesterification of styrene using cationic palladium complexes which proceeds under mild reaction conditions (20) atm, 80° C.) to give 91 to 94% product yield four hours (TOF~11 $h^{-1}$) with a n:iso ratio of 60: recently Seayad et al (Ind. Eng. Chem Res., 37, 1998, 2180) have a catalyst system consisting of $Pd(Oac)_2$, excess $PPh_3$ and p-toluene-sulphonic acid (TsOH), with a n:iso ratio of 35:65 even though various palladium phosphine complexes with N-containing ligands had not been used by then. The drawbacks for these catalyst systems lie in the law yield and reaction rates along with the drastic operating conditions. Thus it was necessary to search for a better process wherein the yield, selectivity are good using milder operating milder operating conditions.

Reference is made to U.S. Pat. No. 6,069,253 wherein Chaudhari et al have described the preparation of metal complexes containing a semilabile anionic ligand, which is a chelating organic compound containing a N-donor and a $O^-$group. Their appropriate use as catalysts for the preparation of the saturated carboxylic acids and esters by the hydrocarboxylation of the olefinically unsaturated compounds has been described in full in U.S. Pat. No. 6,294,687 by the same authors. Describes the process describes the use of a metal complex catalyst with a N—O chelating ligand, a protonic acid and a alkali-metal halide as promoters, in presence or absence of an 120° C. for a reaction period of 30 to 180 minutes under a total pressure of 1 to 40 atmospheres, gained the system major advantages. The high turnover frequencies (~2600 $h^{-1}$) observed along with the height selectivity of >98% of the desired iso-product are some of the distinguishing features of the system. However, being a homogeneous catalyst, the system suffered from major drawback of catalyst-product separation and proper recycle, obviating the need for recyclable heterogeneous catalysts.

An important method for hydrogenising homogeneous catalysts is the application of two-phase systems comprising an aqueous phase containing water-soluble organometallic catalysts and a water immiscible phase (E. G. Kuntz, CHEMTECH, 17, 1987, 540; EP 0107006; B. Cornils, W. A. Herrmann (Eds.), Aqueous phase Organometallic Catalysis, Wiley—VCH, 1998, Weinheim) Reference can be made to recent publication (Chem. Commun. 2000, 1239; J. Mol. Catal. A; Chem, 181 (1–2), 2002, 221); where a novel water-soluble palladium complex catalyst has been proposed for the hydrocarboxylation of olefins giving high selectivity (>98%) to the iso-product. The drawback of this system however was the much lower reaction rates (TOF~280 $h^{-1}$ in comparison of the homogeneous counterpart.

Supported aqueous phase catalysis (SAPC) is another method for the heterogenization of homogeneous catalysts, wherein in water-soluble catalyst martial is contained in the thin film of water adhered to the surface of a high surface area inorganic solid support (U.S. Pat. No. 5,736,980 and U.S. Pat. No. 5,935,892). Reference is made to U.S. Patent publication No. 2002-0137964 wherein Jayasree Seayad, et al has described a process for the preparation of saturated carboxylic acid esters using a novel supported aqueous catalyst by carbonylation reaction. The drawbacks are, very low yields (~20%) and selectivity to the desired iso-product (~55–60%0.

Various other reports attempted the use of supported catalysts for carbonylation reactions. Reference can be made of Wu (U.S. Pat. No. 5,135,026), wherein palladium/copper catalyst support on Montmorillonite KSF, was used for carbonylation of 4-isobuylstyrene in presence of (+)-neomethyldiphenylphosphine as a ligand and Tetrahydrofuiran as solvent at 100° C., 300 psig of carbon monoxide pressure for ~92 hours, producing good selectivity (~97%) to the desired product. Other variations regarding the different cyclic ligands have been discussed in the same. Other relevant references are of Tanielyan et al (U.S. Pat. No. 6,025,295) wherein various supported palladium complexes have been reported to exhibit catalytic property towards carbonization reactions. The main drawbacks of most of the reports are the poor conversion, turnover frequency and selectivity. The stability of the catalysts is also a major issue in all of these cases.

OBJECTS OF THE INVENTION

The main object of the present invention is to provide a process for the preparation of novel immobilized metal complex catalysts and use thereof for carbonylation reactions by anchoring in solid matrices and thereafter, their uses as novel heterogeneous catalysts for carbonylation reactions, which obviates the drawbacks as detailed above.

Another object of this invention is to provide a novel process for the immobilization of the metal complexes inside the porous matrices, essentially the microporous and mesoporous matrices, whereby the transition metal complex being covalently or coordinatively bonded to the interior surface of matrices only, thus with decreased mobility are trapped, hence allowing only insignificant leaching or no leaching of the metal complexes into the reaction mixture under the carbonylation reaction conditions.

Still another object of the invention is to provide an efficient process for the preparation of the saturated carboxylic acids by carboxylic acid by carbonylation reaction using the aforesaid catalysts under mild operating conditions.

Yet another object of the invention is to demonstrate the use of alkali metal halide and any Bronsted acid, specifically organic sulphonic acid in the preparation of the saturated carboxylic acids, with a selectivity constraint of 95% to the desired product Still another object of the invention is to demonstrate the economic usage of catalysts through proper recycles. These catalysts being highly stable, and non-leaching, and hence show excellent recyclability. Even if these heterogeneous catalysts may have lower turnover frequency per batch in comparison to the homogeneous counterparts, the cumulative turnover numbers after the repeated recycles add to value of the process, and hence process economy.

SUMMARY OF THE INVENTION

Accordingly the present invention relates to an immobilized metal complex catalyst of the Formula I

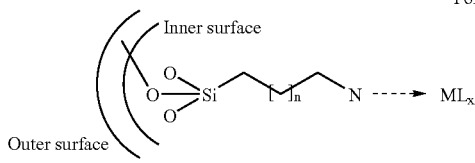

wherein M is a Group VIII metal, n is an integer with a value between 2 and 6, $ML_x$ is an organometallic complex.

The present invention also provides a process for the preparation of an immobilized metal complex catalyst of Formula I

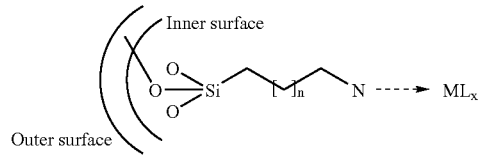

wherein M is a Group VIII metal, n is an integer with a value between 2 and 6, $ML_x$ is an organometallic complex, the process comprising pretreating a solid matrix with an exterior surface and interior surface, by blocking the exterior surface using a blocking agent in a solvent system leaving the interior surface unperturbed, functionalising the interior surface of the solid matrix with a functionalized silane, followed by treating the functionalized matrix to treatment with a transition metal complex solution of formula II

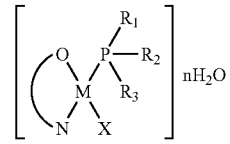

wherein M is a Group VIII metal; $R_1$, $R_2$, and $R_3$ are substituents on the phosphine ligand and are selected from hydrogen, alkyl, aryl, arylalkyl, and arylalkyl cycloaromatic group; X is selected from the group consisting of aryl sulphonato, alkyl sulphonato, aryl carbonate, alkyl carbonate, formato, and a halide selected from the group consisting of Cl, Br, I; N—O is a semilabile anionic chelating ligand containing an N donor and O⁻ group; 1<n<10; to actually anchor the complex to the interior of the solid matrix, to obtain the immobilized metal complex catalyst.

In an embodiment of the invention the solid matrices comprises a microporous or meosporous material selected from Zeolite Y, Zeolite B, ZSM-5 etc. (microporous), and MCM-41, MCM-48 (mesoporous) respectively.

In another embodiment of the invention, the solid matrix is purely siliceous or is aluminated (containing aluminium in the matrix framework). In another embodiment of the invention the blocking agent used for the blocking of the exterior surface is selected from the g5roup consisting of an dialkyl and an diaryl substituted dihalosilane having the general formula of $R_2SiXI_2$, where R is any alkyl, aryl, arylalkyl group etc., and X is a halogen atom selected from Cl, Br, and I. In a further embodiment of the invention the solvent system used for the treatment of the matrix to block the exterior surfaces and subsequent functionalization is selected from the group consisting of dichloromethane, diethylether, dry methonal, dry ethanol, cyclohexane, cyclopentane, hexane, pentane and octane.

In yet another embodiment of the present invention, the functionalizing agent used for anchoring the transition metal complexe to the pretreated matrices is a functionalized—alkyl-substituted $(Z-[CH_2]_n-)$ silane containing at least one alkoxy group (—OR) attached to the silicon atom, having a general formula of $Z-(CH_2)_n-Si(OR)_mH_{3-m}$ wherein Z is a functional group selected from the group consisting of —NH₂, —SH, vinyl and allyl, "n" is an integer between 2 and 6, m is an integer between 1 and 3.

In yet another embodiment of the present invention, the transition metal complex catalyst complex of formula II, is prepared as described in the U.S. Pat. No. 6,069,253.

In still another embodiment of the present invention the transition metal complex are of Formula II wherein M is a group VIII metal: $R_1$, $R_2$, and $R_3$ are substituents on the phosphine ligand and are selected from hydrogen, alkyl, aryl, arylalkyl, or arylalkyl cycloaromatic group; X is selected from aryl sulphonato, alkyl sulphonato, aryl carbonate, alkyl carbonate, formato and a halide selected from the group consisting of Cl, Br, I; N—O is a semilabile anionic chelating ligand containing an N donor and O⁻ group selected from the group consisting of 8-hydroxyquinoline, 2-hydroxypyridine, 2-(2-hydroxyethyl) pyridyl-2-, piperidyl-2-, quinoly-2-, isoquinoly-1-, and isoquinolyl-3-carboxylates, particularly pyridyl-2-carboxylate; and 1<n<10.

In a preferred embodiment of the invention, in formula II, M is Pd; R1, R2, R3, are phenyl; X is p-toluenesulphonato (OTs⁻), N—O is pyridyl-2-carboxylate and n is 3.

In still another embodiment of the present invention the anchoring of the metal complexes of the general formula II is done in a solvent selected from methanol, ethanol, Propanol, acetone and 2-butanone.

The present invention also provides a process for the carbonylation of an aryl olefin or an alcohol of formula III and IV respectively,

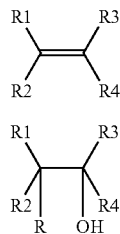

Formula III

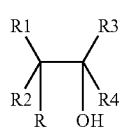

Formula IV wherein R1, R2, R3, R4 and R are independently selected from the group consisting of hydrogen, alkyl, aryl, arylalkyl and arylalkyl cycloaromatic group with or without substituents; which comprises reacting the aryl olefin or alcohol with carbon monoxide (CO) and water (H₂O) as reagents, in the presence of an immobilized metal complex catalyst of Formula I,

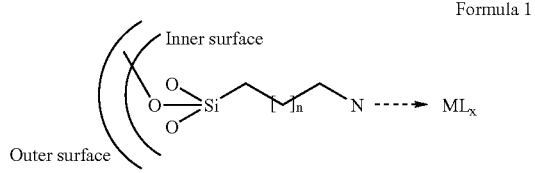

Formula 1 wherein M is a Group VIII metal, n is an integer with a value between 2 and 6, $ML_x$ is an organometallic complex, and in the presence of a promoter selected from an alkali metal halide, and a proton source, in an organic solvent, heating the reaction mixture to a temperature between 30 to 120° C., for a period of 8 hours to 24 hours at a pressure ranging from 1 to 60 atm, cooling the reaction mixture thereafter to ambient temperature, flushing the mixture with inert gas, removing the catalyst by filtration, removing the solvent and isolating a product comprising an isomeric saturated carboxylic acid of Formula V

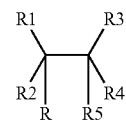

Formula V wherein R1, R2, R3, R4 are independently selected from the group consisting of hydrogen, alkyl, aryl, arylalkyl and arylalkyl cycloaromatic group with or without substituents; R is H or a carboxylic acid group —COOH and R5 is H or a carboxylic acid group —COOH, provided that when R is H, R5 is —COOH and when R is —COOH, R5 is H; in a chemo-selective and regioselective manner.

In yet another embodiment of the invention the proton source is selected from water, a Bronsted acid selected from the group consisting of formic acid, acetic acid, oxalic acid, a hydrohalic acid selected from the grooup consisting of hydrochloric acid, hydrobromic acid and hydroiodic acid, a protonic acid selected from the group consisting of para-toluenesulphonic acid, methane sulphonic acid, trifluoromethanesulphonic acid, and trifluoroacetic acid.

In still another embodiment of the invention the organic solvent used in the carbonylation reaction is an aprotic solvent selected from an aromatic hydrocarbons selected from the group consisting of benzene, toluene and xylene; a ketone selected from the group consisting of methyl ethyl ketone and acetone; an amide comprising N-methyl pyrrolidone; a cycle ether selected from tetrahydrofuran and dioxan, a nitrile comprising acetonitrile.

In yet another embodiment of the invention, the promoter used is an alkali metal promoter selected from the group consisting of an alkali metal halide of the formula M'X, wherein M' is a metal selected from the group consisting of Lithium, Sodium and Potassium and X is a halide selected from the group consisting of chloride, bromide and iodide.

In one embodiment of the invention, the reaction is carried out in the presence of a phosphorous ligand.

In another embodiment of the invention the phosphorous ligand used in the preparation of complex of formula II as well as in the carbonylation is a mono-phosphine selected from the group consisting of triphenyl phosphine, trisparatolyl phosphine, trisparachlorophenyl phosphine, trisparamethoxy phenyl phosphine, tricyclohexyl phosphine, tributyl phosphine and methyldiphenyl phosphine.

In yet another embodiment of the invention the concentration of the Group VIII, metal in the immobilized metal complex catalyst is 1 mole for 1000 to 8000 moles of the substrate, preferably 5600.

In still another embodiment of the invention the number of moles of the acid promoter per gram atom of Group VIII metal in the catalyst system is in the range of 10 to 1000, preferably 580.

In another embodiment of the invention the number of moles of the alkali metal promoter per gram atom of palladium in the catalyst system is in the range of 10 to 1000, preferably 580.

In a further embodiment of the invention the number of moles of the blocking agent for blocking the exterior surface of the porous matrix for one gram of the support is in the range of 0.1 to 1 mmoles, preferable 0.142 mmols.

In a still further embodiment of the invention the amount of the anchoring agent used to anchor the metal complexes to the pretreated support materials is in the range of 1 to 10 mmoles preferentially 5.73 mmols.

In yet another embodiment of the invention the carbonization reaction is carried out in a stirred reactor with catalyst employed being employed as a heterogeneous phase with a suitable solvent in presence of halide and acid promoters, and carbon monoxide.

DETAILED DESCRIPTION OF THE INVENTION

The present invention disclosure details on the novel procedure of heterogenization of palladium complexes in a variety of porous matrices including the microporous and mesoporous materials and furthermore the use of thus prepared catalysts in the carbonylation reaction of olefins and alcohols leading to the preparation of saturated carboxylic acids in good yields, high selectivity to the desired product, and easy and efficient separation of the catalyst from the products, and thus achieving higher recyclability to the catalyst.

The stepwise description of the heterogenization of the homogeneous palladium complex catalyst and carbonylation reaction using them is as follows. The process described in U.S. Pat. No. 6,069,253 synthesizes the metal complex catalysts, the contents of which are incorporated herein by reference comprises reacting the group VIII metal source with a N—O semilabile chelating ligand, a monodentate phosphine ligand and the protonic acid in an organic solvent and stirring at ambient temperature for a period of 1 to 20 minutes, precipitating the product using a suitable organic solvent, washing, drying to obtain the complex catalyst of formula II. The porous supports were treated with diaryl or dialkyl dihalosilane in a specified proportion to block the exterior surface only, typically in an experiment, the solid matrix was taken as a slurry in an organic solvent and stirred with the blocking agent for 1 to 4 hours at ambient temperature, cooled to 190 to 200 K, the functionalization of the pretreated supports is undergone by stirring the same suspension of the support with the addition of the anchoring agent of the formula I for a period of 12 to 24 hrs. at a temperature of 313 to 343 K, thereafter filtering, washing and drying provides, the functionalized porous supports. The treatment of the functionalized support with a solution of the transition metal complex in a suitable solvent and stirring at ambient temperature for about 12 to 20 hours causes the metal complex to get anchored to the porous supports. Filtering followed by through washing, and drying renders the solid heterogeneous catalyst.

The process of invention will now be described with reference to the following examples. However, it should be noted that the following examples are illustrative and should not be construed to limit the scope of the present invention in any manner.

EXAMPLE 1

Surface Passivation and Functionalization (with Zeolite-Y)

To a 50 ml round-bottomed flask, following were added simultaneously

| | |
|---|---|
| Zeolite Y | 1.0 g. |
| Solvent | Dichloromethane (DCM), 30 ml. |
| $Ph_2SiCl_2$ (DDPS) | 0.142 mmol |
| 3-aminopropyltrimethoxysilane (APTS) | 5.73 MMOL |

Passivation of the external silanol group (Si—OH) of the zeolite Y support was achieved by suspending the required reagents as stated above in DCM and adding DDPS dropwise to the above slurry. The slurry was then stirred for 1h at room temperature and then cooled to 195 K. to this slurry required amount of APTS was added drop wise and stirred for further 24 h at 313 K. the contents were then filtered, washed repeatedly with dry DCM and dried under vacuum to obtain white solid powder (product) to obtain DDPS tethered, APTS anchored zeolite Y.

EXAMPLE 2

Surface Passivation and Functionalization (with Zeolite-Y)

To a 50 ml round-bottomed flask, following reagents were added simultaneously

| | |
|---|---|
| Zeolite Y | 1.0 g |
| Solvent | Dichloromethane (DCN), 30 ml |
| $Ph_2SiCl_2$ (DDPS) | 0.142 mmol |
| 3-aminopropyltrimethoxysilane (APTS) | 17:19 mmol |

Passivation of the external silanol group (Si—OH) of the zeolite Y support was achieved by suspending the required reagents as stated above in DCM and adding DDPS dropwise to the above slurry. The slurry was then stirred for 1 h at room temperature and then cooled to 195 K. to this slurry required amount of APTS was added drop wise and stirred for further 24 h at 313 K. the contents were then filtered, washed repeatedly with dry DCM ad dried under vacuum to obtain white solid powder (product) to obtain DDPS tethered, APTS anchored zeolite Y.

EXAMPLE 3

Surface Passivation and Functionalization (with MCM-41)

To a 50 ml round-bottomed flask, following reagents were added simultaneously

| | |
|---|---|
| Si-MCM - 41 | 1.0 g |
| Solvent | Dichloromethane (DCM), 30 ml |
| $Ph_2SiCl_2$ (DDPS) | 0.142 mmol |
| 3-aminopropyltrimethoxysilane (APTS) | 5.73 mmol |

Passivation of the external silanol group (Si—OH) of the Si-MCM-41 support was achieved by suspending the required reagents as stated above in DCM and adding DDPS drop-wise to the above slurry. The slurry was then stirred for 1 h at room temperature and then cooled to 195 K. to this slurry required amount of APTS was added drop wise and stirred for further 24 h at 313 K. the contents were then filtered, washed repeatedly with dry DCM and dried under vacuum to obtain white solid powder (product) to obtain DDPS tethered, APTS anchored Si-MCM-41.

EXAMPLE 4

Surface Passivation and Functionalization (with MCM-41)

To a 50 ml round-bottomed flask, following reagents were added simultaneously

| | |
|---|---|
| Si-MCM - 41 | 1.0 g |
| Solvent | Dichloromethane (DCM), 30 ml |
| Ph2SiCl2 (DDPS) | 0.142 mmol |
| 3-aminopropyltrimethoxysilane (APTS) | 17.19 MMOL |

Passivation of the external silanol group (Si—OH) of the Si-MCM-41 support was achieved by suspending the required reagents as stated above in DCM and adding DDPS drop-wise to the above slurry. The slurry was then stirred for 1 h at room temperature and then cooled to 195 K. to this slurry required amount of APTS was added drop wise and stirred for further 24 h at 313 K. the contents were then filtered, washed repeatedly with dry DCM and dried under vacuum to obtain white solid powder (product) to obtain DDPS tethered, APTS anchored Si-MCM-41.

EXAMPLE 5

Surface Passivation and Functionalization (with MCM-48)

To a 50 ml round-bottomed flask, following reagents were added simultaneously

| | |
|---|---|
| Si - MCM - 48 | 1.0 g |
| Solvent | Dichloromethane (DCM), 30 ml |
| Ph$_2$SiCl$_2$ (DDPS) | 0.142 mmol |
| 3-aminopropyltrimethoxysilane (APTS) | 5.73 mmol |

Passivation of the external silanol groups (Si—OH) of the Si-MCM-48 support was achieved by suspending the required reagents as stated above in DCM and adding DDPS drop-wise to the above slurry. The slurry was then stirred for 1 h at room temperature and then cooled to 195 K. to this contents were then filtered, washed repeatedly with dry DCM and dried under vacuum to obtain white solid powder (product) to obtain DDPS tethered APTS anchored Si-MCM-48.

EXAMPLE 6

Surface Passivation and Functionalization (with MCM-48)

To a 50 ml round-bottomed flask, following reagents were added simultaneously

| | |
|---|---|
| Si - MCM - 48 | 1.0 g |
| Solvent | Dichloromethane (DCM), 30 ml |
| Ph$_2$SiCl$_2$ (DDPS) | 0.142 mmol |
| 3-aminopropyltrimethoxysilane (APTS) | 17.19 mmol |

Passivation of the external silanol groups (Si—OH) of the Si-MCM-48 support was achieved by suspending the required reagents as stated above in DCM and adding DDPS drop-wise to the above slurry. The slurry was then stirred for 1 h at room temperature and then cooled to 195 K. To this slurry required amount of APTS was added drop wish and stirred for further 24 h at 313 K. the contents were then filtered, washed repeatedly with dry DCM and dried under vacuum to obtain white solid powder (product) to obtain DDPS tethered, APTS anchored Si-MCM-48.

EXAMPLE 7

Anchoring of Metal Complex to Functionalized Supports (with Zeolite Y)

To a 50 ml round-bottomed flask, following were taken simultaneously

| | |
|---|---|
| Palladium complex | 0.46 mmols |
| Solvent | Methanol, distilled and dried freshly, 100 ml |
| Zeolite Y | 1 g |

The complex was mixed thoroughly in the solvent and after that 1 g of Zeolite Y was added to the solution. The mixture was stirred for 12 hrs at ambient temperature. The slurry was filtered, washed with dry methanol, and then Soxhlet extracted twice to remove any complex adhering to the external surface, and dried using vacuum.

EXAMPLE 8

Anchoring of Metal Complex to Functionalized Suports (with Zeolite Y)

To a 250 ml round-bottomed flask, following were taken simultaneously

| | |
|---|---|
| Palladium complex | 1 mmol |
| Solvent | Methanol, distilled and dried freshly, 100 ml |
| Zeolite Y | 1 g |

The complex was mixed thoroughly in the solvent and after that 1 g of Zeolite Y was added to the solution. The mixture was stirred for 12 hrs at ambient temperature. The slurry was filtered, washed with dry methanol, and then Soxhlet extracted twice to remove any complex adhering to the external surface, and dried using vacuum.

EXAMPLE 9

Anchoring of Metal Complex to Functionalized Supports (with MCM-41)

To a 250 ml round-bottomed flask, following were taken simultaneously

| | |
|---|---|
| Palladium complex | 0.46 mmols |
| Solvent | Methanol, distilled and dried freshly, 100 ml |
| Functionalized MCM-41 | 1 g |

The complex was mixed thoroughly in the solvent and after that 1 g of Functionalized MCM-41 was added to the solution. The mixture was stirred for 16 hrs at ambient temperature. The slurry was filtered, washed with dry methanol, and then Soxhlet extracted twice to remove any complex adhering to the external surface, and dried using vacuum.

EXAMPLE 10

Anchoring of Metal Complex to Functionalized Supports (with MCM-41)

To a 250 ml round-bottomed flask, following were taken simultaneously

| | |
|---|---|
| Palladium complex | 1.0 mmol |
| Solvent | Methanol, distilled and dried freshly, 100 ml |
| Functionalized MCM-41 | 1 g |

The complex was mixed thoroughly in the solvent and after that 1 g of Functionalized MCM-41 was added to the solution. The mixture was stirred for 16 hrs at ambient temperature. The slurry was filtered, washed with dry methanol, and then Soxhlet extracted twice to remove any complex adhering to the external surface, and dried using vacuum.

EXAMPLE 11

Anchoring of Metal Complex to Functionalized Supports (with MCM-48)

To a 250 ml round-bottomed flask, following were taken simultaneously

| | |
|---|---|
| Palladium complex | 0.46 mmols |
| Solvent | Methanol, distilled and dried freshly, 100 ml |
| Functionalized MCM-48 | 1 g |

The complex was mixed thoroughly in the solvent and after that 1 g of Functionalized MCM-48 was added to the solution. The mixture was stirred for 16 hrs at ambient temperature. The slurry was filtered, washed with dry methanol, and then Soxhlet extracted twice to remove any complex adhering to the external surface, and dried using vacuum.

EXAMPLE 12

Anchoring of Metal Complex to Functionalized Supports (with MCM-48)

To a 250 ml round-bottomed flask, following were taken simultaneously

| | |
|---|---|
| Palladium complex | 1.0 mmol |
| Solvent | Methanol, distilled and dried freshly, 100 ml |
| Functionalized MCM-48 | 1 g |

The complex was mixed thoroughly in the solvent and after that 1 g of Functionalized MCM-48 was added to the solution. The mixture was stirred for 16 hrs at ambient temperature. The slurry was filtered, washed with dry methanol, and then Soxhlet extracted twice to remove any complex adhering to the external surface, and dried using vacuum.

EXAMPLE 13

A 50 ml autoclave was charged with the following reactants

| | |
|---|---|
| Styrene | 4.8 mmol |
| Catalyst | Formula II a anchored on zeolite Y, 50 mg |
| LiCl | 0.5 mmol |
| TsOH | 0.5 mmol |
| PPh$_3$ | 0.095 mmol |
| H$_2$O | 0.01 mmol |
| Solvent | methyl ethyl ketone (MEK) 23 ml |
| Agitation speed | 1100 rpm |

The contents of the autoclave were flushed with nitrogen and then with carbon monoxide several times. Thereafter the contents were heated up to 115° C. After the temperature is attained, the autoclave was pressurized to 3.06 Mpa, stirring was started. It was observed that the reaction was initially slow and the gas absorption gradually increased. The pressure in the autoclave was maintained constant using carbon monoxide and the progress of the reaction was monitored by observing the pressure drop and by liquid sampling. The reaction was continued until the pressure drop was too low. The reactor was then cooled to ambient temperature and the liquid phase analyzed by gas chromatography.

The GC analysis showed TOF of 260 h$^{-1}$ and 92% conversion of styrene with an isoselectivity of 89.3%. The catalyst was isolated by removal of the solvent and the unreacted styrene by distillation and passing the solution through activated alumina, followed by gas chromatography.

EXAMPLE 14

A 50 ml autoclave was charged with the following reactants

| | |
|---|---|
| 4-methyl styrene | 4.8 mmol |
| Catalyst | Formula II a anchored on zeolite Y, 50 mg |
| LiCl | 0.5 mmol |
| TsOH | 0.5 mmol |
| PPh$_3$ | 0.095 mmol |
| H$_2$O | 0.01 mmol |
| Solvent | methyl ethyl ketone (MEK) 23 ml |
| Agitation speed | 1100 rpm |

The contents of the autoclave were flushed with nitrogen and then with carbon monoxide several times. Thereafter the contents were heated up to 115° C. After the temperature is attained, the autoclave was pressurized to 3.06 Mpa, stirring was started. It was observed that the reaction was initially slow and the gas absorption gradually increased. The pressure in the autoclave was maintained constant using carbon monoxide and the progress of the reaction was monitored by observing the pressure drop and by liquid sampling. The reaction was continued until the pressure drop was too low. The reactor was then cooled to ambient temperature and the liquid phase analyzed by gas chromatography.

The GC analysis showed TOF of 160 $h^{-1}$ and 92% conversion of 4-methyl styrene with an isoselectivity of 86%. The catalyst was isolated by removal of the solvent and the unreacted styrene by distillation and passing the solution through activated alumina, followed by gas chromatography.

EXAMPLE 15

A 50 ml autoclave was charged with the following reactants

| 4-tertbutyl styrene | 4.8 mmol |
|---|---|
| Catalyst | Formula II a anchored on zeolite Y, 50 mg |
| LiCl | 0.5 mmol |
| TsOH | 0.5 mmol |
| PPh$_3$ | 0.095 mmol |
| H$_2$O | 0.01 mmol |
| Solvent | methyl ethyl ketone (MEK) 23 ml |
| Agitation speed | 1100 rpm |

The contents of the autoclave were flushed with nitrogen and then with carbon monoxide several times. Thereafter the contents were heated up to 115° C. After the temperature is attained, the autoclave was pressurized to 3.06 Mpa, stirring was started. It was observed that the reaction was initially slow and the gas absorption gradually increased. The pressure in the autoclave was maintained constant using carbon monoxide and the progress of the reaction was monitored by observing the pressure drop and by liquid sampling. The reaction was continued until the pressure drop was too low. The reactor was then cooled to ambient temperature and the liquid phase analyzed by gas chromatography.

The GC analysis showed TOF of 146 $h^{-1}$ and 88% conversion of 4-tertbutyl styrene with an isoselectivity of 92%. The catalyst was isolated by removal of the solvent and the unreacted styrene by distillation and passing the solution through activated alumina, followed by gas chromatography.

EXAMPLE 16

A 50 ml autoclave was charged with the following reactants

| 4-isobutylphenyl ethanol | 4.8 mmol |
|---|---|
| Catalyst | Formula II a anchored on zeolite Y, 50 mg |
| LiCl | 0.5 mmol |
| TsOH | 0.5 mmol |
| PPh$_3$ | 0.095 mmol |
| H$_2$O | 0.01 mmol |
| Solvent | methyl ethyl ketone (MEK) 23 ml |
| Agitation speed | 1100 rpm |

The contents of the autoclave were flushed with nitrogen and then with carbon monoxide several times. Thereafter the contents were heated up to 115° C. After the temperature is attained, the autoclave was pressurized to 3.06 Mpa, stirring was started. It was observed that the reaction was initially slow and the gas absorption gradually increased. The pressure in the autoclave was maintained constant using carbon monoxide and the progress of the reaction was monitored by observing the pressure drop and by liquid sampling. The reaction was continued until the pressure drop was too low. The reactor was then cooled to ambient temperature and the liquid phase analyzed by gas chromatography.

The GC analysis showed TOF of 140 $h^{-1}$ and 92% conversion of the 4-isobutylphenyl ethanol with an isoselectivity of 93%. The catalyst was isolated by removal of the solvent and the unreacted styrene by distillation and passing the solution through activated alumina, followed by gas chromatography.

EXAMPLE 17

A 50 ml autoclave was charged with the following reactants

| Styrene | 4.8 mmol |
|---|---|
| Catalyst | Formula II a anchored on MCM-41, 50 mg |
| LiCl | 0.5 mmol |
| TsOH | 0.5 mmol |
| PPh$_3$ | 0.095 mmol |
| H$_2$O | 0.01 mmol |
| Solvent | methyl ethyl ketone (MEK) 23 ml |
| Agitation speed | 1100 rpm |

The contents of the autoclave were flushed with nitrogen and then with carbon monoxide several times. Thereafter the contents were heated up to 115° C. After the temperature is attained, the autoclave was pressurized to 3.06 Mpa, stirring was started. It was observed that the reaction was initially slow and the gas absorption gradually increased. The pressure in the autoclave was maintained constant using carbon monoxide and the progress of the reaction was monitored by observing the pressure drop and by liquid sampling. The reaction was continued until the pressure drop was too low. The reactor was then cooled to ambient temperature and the liquid phase analyzed by gas chromatography.

The GC analysis showed TOF of 463 $h^{-1}$ and 98% conversion of styrene with an isoselectivity of 99.3%. The catalyst was isolated by removal of the solvent and the unreacted styrene by distillation and passing the solution through activated alumina, followed by gas chromatography.

EXAMPLE 18

A 50 ml autoclave was charged with the following reactants

| Styrene | 4.8 mmol |
|---|---|
| Catalyst (from the previous reaction) | Formula II a anchored on MCM-41, 50 mg |
| LiCl | 0.5 mmol |
| TsOH | 0.5 mmol |
| PPh$_3$ | 0.095 mmol |
| H$_2$O | 0.01 mmol |
| Solvent | methyl ethyl ketone (MEK) 23 ml |
| Agitation speed | 1100 rpm |

The catalyst from the previous reaction was kept in the autoclave, and fresh charge of substrate along with the promoters and free phosphine were fed into the reactor. The contents of the autoclave were flushed with nitrogen and then with carbon monoxide several times. Thereafter the contents were heated up to 115° C. After the temperature is attained, the autoclave was pressurized to 3.06 Mpa, stirring was started. It was observed that the reaction was initially slow and the gas absorption gradually increased. The pressure in the autoclave was maintained constant using carbon monoxide and the progress of the reaction was monitored by observing the pressure drop and by liquid sampling. The reaction was continued until the pressure drop was too low. The reactor was then cooled to ambient temperature and the liquid phase analyzed by gas chromatography.

The GC analysis showed TOF of 459 $h^{-1}$ and 96% conversion of styrene with an isoselectivity of 99.5%. The catalyst was isolated by simple filtration and the product was isolated by removal of the solvent and the unreacted styrene by distillation and passing the solution through activated alumina, followed by gas chromatography. This was the first recycle reaction. The final reaction mixture showed only ~3.5×$10^{-4}$% palladium leaching.

EXAMPLE 19

A 50 ml autoclave was charged with the following reactants

| | |
|---|---|
| Styrene | 4.8 mmol |
| Catalyst (from the first recycle reaction) | Formula II a anchored on MCM-41, 50 mg |
| LiCl | 0.5 mmol |
| TsOH | 0.5 mmol |
| PPh$_3$ | 0.095 mmol |
| H$_2$O | 0.01 mmol |
| Solvent | methyl ethyl ketone (MEK) 23 ml |
| Agitation speed | 1100 rpm |

The catalyst from the previous reaction was kept in the autoclave, and fresh charge of substrate along with the promoters and free phosphine were fed into the reactor. The contents of the autoclave were flushed with nitrogen and then with carbon monoxide several times. Thereafter the contents were heated up to 115° C. After the temperature is attained, the autoclave was pressurized to 3.06 Mpa, stirring was started. It was observed that the reaction was initially slow and the gas absorption gradually increased. The pressure in the autoclave was maintained constant using carbon monoxide and the progress of the reaction was monitored by observing the pressure drop and by liquid sampling. The reaction was continued until the pressure drop was too low. The reactor was then cooled to ambient temperature and the liquid phase analyzed by gas chromatography.

The GC analysis showed TOF of 450 $h^{-1}$ and 95% conversion of styrene with an isoselectivity of 97.5%. The catalyst was isolated by simple filtration and the product was isolated by removal of the solvent and the unreacted styrene by distillation and passing the solution through activated alumina, followed by gas chromatography. This was the second recycle reaction. The final reaction mixture showed only ~3.2×$10^{-4}$% palladium leaching.

EXAMPLE 20

A 50 ml autoclave was charged with the following reactants

| | |
|---|---|
| Styrene | 4.8 mmol |
| Catalyst (from the second recycle reaction) | Formula II a anchored on MCM-41, 50 mg |
| LiCl | 0.5 mmol |
| TsOH | 0.5 mmol |
| PPh$_3$ | 0.095 mmol |
| H$_2$O | 0.01 mmol |
| Solvent | methyl ethyl ketone (MEK) 23 ml |
| Agitation speed | 1100 rpm |

The catalyst from the previous second recycle reaction was kept in the autoclave, and fresh charge of substrate along with the promoters and free phosphine were fed into the reactor. The contents of the autoclave were flushed with nitrogen and then with carbon monoxide several times. Thereafter the contents were heated up to 115° C. After the temperature is attained, the autoclave was pressurized to 3.06 Mpa, stirring was started. It was observed that the reaction was initially slow and the gas absorption gradually increased. The pressure in the autoclave was maintained constant using carbon monoxide and the progress of the reaction was monitored by observing the pressure drop and by liquid sampling. The reaction was continued until the pressure drop was too low. The reactor was then cooled to ambient temperature and the liquid phase analyzed by gas chromatography.

The GC analysis showed TOF of 450 $h^{-1}$ and 96% conversion of styrene with an isoselectivity of 99.4%. The catalyst was isolated by simple filtration and the product was isolated by removal of the solvent and the unreacted styrene by distillation and passing the solution through activated alumina, followed by gas chromatography. This was the third recycle reaction. The final reaction mixture showed only ~3.2×$10^{-4}$% palladium, which showed only negligible amount of metal leaching in the reaction mixture.

EXAMPLE 21

A 50 ml autoclave was charged with the following reactants

| | |
|---|---|
| 4-methylstyrene | 4.8 mmol |
| Catalyst | Formula II a anchored on MCM-41, 50 mg |
| LiCl | 0.5 mmol |
| TsOH | 0.5 mmol |
| PPh$_3$ | 0.095 mmol |
| H$_2$O | 0.01 mmol |
| Solvent | methyl ethyl ketone (MEK) 23 ml |
| Agitation speed | 1100 rpm |

The contents of the autoclave were flushed with nitrogen and then with carbon monoxide several times. Thereafter the contents were heated up to 115° C. After the temperature is attained, the autoclave was pressurized to 3.06 Mpa, stirring was started. It was observed that the reaction was initially slow and the gas absorption gradually increased. The pressure in the autoclave was maintained constant using carbon monoxide and the progress of the reaction was monitored by observing the pressure drop and by liquid sampling. The reaction was continued until the pressure drop was too low.

The reactor was then cooled to ambient temperature and the liquid phase analyzed by gas chromatography.

The GC analysis showed TOF of 406 h$^{-1}$ and 97.8% conversion of 4-methylstyrene with an isoselectivity of 98.6%. The catalyst was isolated by removal of the solvent and the unreacted styrene by distillation and passing the solution through activated alumina, followed by gas chromatography.

EXAMPLE 22

A 50 ml autoclave was charged with the following reactants

| | |
|---|---|
| 4-tertbutylstyrene | 4.8 mmol |
| Catalyst | Formula II a anchored on MCM-41, 50 mg |
| LiCl | 0.5 mmol |
| TsOH | 0.5 mmol |
| PPh$_3$ | 0.095 mmol |
| H$_2$O | 0.01 mmol |
| Solvent | methyl ethyl ketone (MEK) 23 ml |
| Agitation speed | 1100 rpm |

The contents of the autoclave were flushed with nitrogen and then with carbon monoxide several times. Thereafter the contents were heated up to 115° C. After the temperature is attained, the autoclave was pressurized to 3.06 Mpa, stirring was started. It was observed that the reaction was initially slow and the gas absorption gradually increased. The pressure in the autoclave was maintained constant using carbon monoxide and the progress of the reaction was monitored by observing the pressure drop and by liquid sampling. The reaction was continued until the pressure drop was too low. The reactor was then cooled to ambient temperature and the liquid phase analyzed by gas chromatography.

The GC analysis showed TOF of 286 h$^{-1}$ and 93.4% conversion of 4-tertbutylstyrene with an isoselectivity of 99.3%. The catalyst was isolated by removal of the solvent and the unreacted styrene by distillation and passing the solution through activated alumina, followed by gas chromatography.

EXAMPLE 23

A 50 ml autoclave was charged with the following reactants

| | |
|---|---|
| 4-isobutylphenyl ethanol | 4.8 mmol |
| Catalyst | Formula II a anchored on MCM-41, 50 mg |
| LiCl | 0.5 mmol |
| TsOH | 0.5 mmol |
| PPh$_3$ | 0.095 mmol |
| H$_2$O | 0.01 mmol |
| Solvent | methyl ethyl ketone (MEK) 23 ml |
| Agitation speed | 1100 rpm |

The contents of the autoclave were flushed with nitrogen and then with carbon monoxide several times. Thereafter the contents were heated up to 115° C. After the temperature is attained, the autoclave was pressurized to 3.06 Mpa, stirring was started. It was observed that the reaction was initially slow and the gas absorption gradually increased. The pressure in the autoclave was maintained constant using carbon monoxide and the progress of the reaction was monitored by observing the pressure drop and by liquid sampling. The reaction was continued until the pressure drop was too low. The reactor was then cooled to ambient temperature and the liquid phase analyzed by gas chromatography.

The GC analysis showed TOF of 450 h$^{-1}$ and 96% conversion of 4-isobutylphenyl ethanol with an isoselectivity of 97.5%. The catalyst was isolated by removal of the solvent and the unreacted styrene by distillation and passing the solution through activated alumina, followed by gas chromatography.

EXAMPLE 24

A 50 ml autoclave was charged with the following reactants

| | |
|---|---|
| Styrene | 4.8 mmol |
| Catalyst | Formula II a anchored on MCM-48, 50 mg |
| LiCl | 0.5 mmol |
| TsOH | 0.5 mmol |
| PPh$_3$ | 0.095 mmol |
| H$_2$O | 0.01 mmol |
| Solvent | methyl ethyl ketone (MEK) 23 ml |
| Agitation speed | 1100 rpm |

The contents of the autoclave were flushed with nitrogen and then with carbon monoxide several times. Thereafter the contents were heated up to 115° C. After the temperature is attained, the autoclave was pressurized to 3.06 Mpa, stirring was started. It was observed that the reaction was initially slow and the gas absorption gradually increased. The pressure in the autoclave was maintained constant using carbon monoxide and the progress of the reaction was monitored by observing the pressure drop and by liquid sampling. The reaction was continued until the pressure drop was too low. The reactor was then cooled to ambient temperature and the liquid phase analyzed by gas chromatography.

The GC analysis showed TOF of 417 h$^{-1}$ and 98.7% conversion of styrene with an isoselectivity of 99.03%. The catalyst was isolated by removal of the solvent and the unreacted styrene by distillation and passing the solution through activated alumina, followed by gas chromatography.

EXAMPLE 25

A 50 ml autoclave was charged with the following reactants

| | |
|---|---|
| Styrene | 4.8 mmol |
| Catalyst (from the previous reaction) | Formula II a anchored on MCM-48, 50 mg |
| LiCl | 0.5 mmol |
| TsOH | 0.5 mmol |
| PPh$_3$ | 0.095 mmol |
| H$_2$O | 0.01 mmol |
| Solvent | methyl ethyl ketone (MEK) 23 ml |
| Agitation speed | 1100 rpm |

The catalyst from the previous reaction was kept in the autoclave, and fresh charge of substrate along with the promoters and free phosphine were fed into the reactor. The contents of the autoclave were flushed with nitrogen and then with carbon monoxide several times. Thereafter the contents were heated up to 115° C. After the temperature is attained, the autoclave was pressurized to 3.06 Mpa, stirring was started. It was observed that the reaction was initially slow and the gas absorption gradually increased. The pressure in the autoclave was maintained constant using carbon monoxide and the progress of the reaction was monitored by observing the pressure drop and by liquid sampling. The reaction was continued until the pressure drop was too low. The reactor was then cooled to ambient temperature and the liquid phase analyzed by gas chromatography.

The GC analysis showed TOF of 412 $h^{-1}$ and 98% conversion of styrene with an isoselectivity of 98.8%. The catalyst was isolated by simple filtration and the product was isolated by removal of the solvent and the unreacted styrene by distillation and passing the solution through activated alumina, followed by gas chromatography. This was the first recycle reaction. The final reaction mixture showed only ~3×10$^{-4}$% palladium leaching.

EXAMPLE 26

A 50 ml autoclave was charged with the following reactants

| | |
|---|---|
| Styrene | 4.8 mmol |
| Catalyst (from the first recycle reaction) | Formula II a anchored on MCM-48, 50 mg |
| LiCl | 0.5 mmol |
| TsOH | 0.5 mmol |
| PPh$_3$ | 0.095 mmol |
| H$_2$O | 0.01 mmol |
| Solvent | methyl ethyl ketone (MEK) 23 ml |
| Agitation speed | 1100 rpm |

The catalyst from the previous reaction was kept in the autoclave, and fresh charge of substrate along with the promoters and free phosphine were fed into the reactor. The contents of the autoclave were flushed with nitrogen and then with carbon monoxide several times. Thereafter the contents were heated up to 115° C. After the temperature is attained, the autoclave was pressurized to 3.06 Mpa, stirring was started. It was observed that the reaction was initially slow and the gas absorption gradually increased. The pressure in the autoclave was maintained constant using carbon monoxide and the progress of the reaction was monitored by observing the pressure drop and by liquid sampling. The reaction was continued until the pressure drop was too low. The reactor was then cooled to ambient temperature and the liquid phase analyzed by gas chromatography.

The GC analysis showed TOF of 400 $h^{-1}$ and 95% conversion of styrene with an isoselectivity of 97.5%. The catalyst was isolated by simple filtration and the product was isolated by removal of the solvent and the unreacted styrene by distillation and passing the solution through activated alumina, followed by gas chromatography. This was the second recycle reaction. The final reaction mixture showed only ~3×10$^{-4}$% palladium leaching.

EXAMPLE 27

A 50 ml autoclave was charged with the following reactants

| | |
|---|---|
| Styrene | 4.8 mmol |
| Catalyst (from the second recycle reaction) | Formula II a anchored on MCM-48, 50 mg |
| LiCl | 0.5 mmol |
| TsOH | 0.5 mmol |
| PPh$_3$ | 0.095 mmol |
| H$_2$O | 0.01 mmol |
| Solvent | methyl ethyl ketone (MEK) 23 ml |
| Agitation speed | 1100 rpm |

The catalyst from the previous second recycle reaction was kept in the autoclave, and fresh charge of substrate along with the promoters and free phosphine were fed into the reactor. The contents of the autoclave were flushed with nitrogen and then with carbon monoxide several times. Thereafter the contents were heated up to 115° C. After the temperature is attained, the autoclave was pressurized to 3.06 Mpa, stirring was started. It was observed that the reaction was initially slow and the gas absorption gradually increased. The pressure in the autoclave was maintained constant using carbon monoxide and the progress of the reaction was monitored by observing the pressure drop and by liquid sampling. The reaction was continued until the pressure drop was too low. The reactor was then cooled to ambient temperature and the liquid phase analyzed by gas chromatography.

The GC analysis showed TOF of 402 $h^{-1}$ and 96% conversion of styrene with an isoselectivity of 97.5%. The catalyst was isolated by simple filtration and the product was isolated by removal of the solvent and the unreacted styrene by distillation and passing the solution through activated alumina, followed by gas chromatography. This was the third recycle reaction. The final reaction mixture showed only ~3×10$^{-4}$% palladium leaching.

EXAMPLE 28

A 50 ml autoclave was charged with the following reactants

| | |
|---|---|
| 4-methylstyrene | 4.8 mmol |
| Catalyst | Formula II a anchored on MCM-48, 50 mg |
| LiCl | 0.5 mmol |
| TsOH | 0.5 mmol |
| PPh$_3$ | 0.095 mmol |
| H$_2$O | 0.01 mmol |
| Solvent | methyl ethyl ketone (MEK) 23 ml |
| Agitation speed | 1100 rpm |

The contents of the autoclave were flushed with nitrogen and then with carbon monoxide several times. Thereafter the contents were heated up to 115° C. After the temperature is attained, the autoclave was pressurized to 3.06 Mpa, stirring was started. It was observed that the reaction was initially slow and the gas absorption gradually increased. The pressure in the autoclave was maintained constant using carbon monoxide and the progress of the reaction was monitored by observing the pressure drop and by liquid sampling. The reaction was continued until the pressure drop was too low. The reactor was then cooled to ambient temperature and the liquid phase analyzed by gas chromatography.

The GC analysis showed TOF of 367 $h^{-1}$ and 98% conversion of 4-methylstyrene with an isoselectivity of 99.1%. The catalyst was isolated by removal of the solvent and the unreacted styrene by distillation and passing the solution through activated alumina, followed by gas chromatography.

EXAMPLE 29

A 50 ml autoclave was charged with the following reactants

| | |
|---|---|
| 4-tertbutylstyrene | 4.8 mmol |
| Catalyst | Formula II a anchored on MCM-48, 50 mg |
| LiCl | 0.5 mmol |
| TsOH | 0.5 mmol |
| PPh$_3$ | 0.095 mmol |
| H$_2$O | 0.01 mmol |
| Solvent | methyl ethyl ketone (MEK) 23 ml |
| Agitation speed | 1100 rpm |

The contents of the autoclave were flushed with nitrogen and then with carbon monoxide several times. Thereafter the contents were heated up to 115° C. After the temperature is attained, the autoclave was pressurized to 3.06 Mpa, stirring was started. It was observed that the reaction was initially slow and the gas absorption gradually increased. The pressure in the autoclave was maintained constant using carbon monoxide and the progress of the reaction was monitored by observing the pressure drop and by liquid sampling. The reaction was continued until the pressure drop was too low. The reactor was then cooled to ambient temperature and the liquid phase analyzed by gas chromatography.

The GC analysis showed TOF of 262 h$^{-1}$ and 95% conversion of 4-tertbutylstyrene with an isoselectivity of 99.23%. The catalyst was isolated by removal of the solvent and the unreacted styrene by distillation and passing the solution through activated alumina, followed by gas chromatography.

EXAMPLE 30

A 50 ml autoclave was charged with the following reactants

| | |
|---|---|
| 4-isobutylphenyl ethanol | 4.8 mmol |
| Catalyst | Formula II a anchored on MCM-48, 50 mg |
| LiCl | 0.5 mmol |
| TsOH | 0.5 mmol |
| PPh$_3$ | 0.095 mmol |
| H$_2$O | 0.01 mmol |
| Solvent | methyl ethyl ketone (MEK) 23 ml |
| Agitation speed | 1100 rpm |

The contents of the autoclave were flushed with nitrogen and then with carbon monoxide several times. Thereafter the contents were heated up to 115° C. After the temperature is attained, the autoclave was pressurized to 3.06 Mpa, stirring was started. It was observed that the reaction was initially slow and the gas absorption gradually increased. The pressure in the autoclave was maintained constant using carbon monoxide and the progress of the reaction was monitored by observing the pressure drop and by liquid sampling. The reaction was continued until the pressure drop was too low. The reactor was then cooled to ambient temperature and the liquid phase analyzed by gas chromatography.

The GC analysis showed TOF of 439 h$^{-1}$ and 95% conversion of 4-isobutylphenyl ethanol with an isoselectivity of 97.1%. The catalyst was isolated by removal of the solvent and the unreacted styrene by distillation and passing the solution through activated alumina, followed by gas chromatography.

From the above examples, it can be inferred that the catalyst system described here is highly active, produces satisfactory selectivity to the desired products, and is also easily separable and efficiently recycles with only a negligible amount of metal leaching into the reaction mixture, thereby ensuring the stability of the same. Thus the novelty lies in the preparation procedure and application of the catalyst for a class of reaction, which is otherwise know be difficult.

The Main Advantages of the Present Invention Are:
1. The invention provides a novel process for the preparation of truly heterogeneous metal complex catalysts and their application in the carbonylation reaction of olefins and alcohols for the preparation of saturated carboxylic acids.
2. The stability of the catalyst as envisaged in the disclosure is a major benchmark in the field of heterogeneous carbonylation catalysis, which ensures easy and efficient recycle of the solid catalysts not noticed previously.
3. High substrate to catalyst (metal) ratio as well as the mild operating conditions as envisioned in the disclosure is the key issue in the system economics.

We claim:

1. An immobilized metal complex catalyst of the Formula I

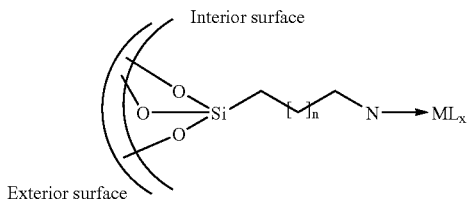

Formula I wherein M is a Group VIII metal, n is an integer in the range from 2 to 6, ML$_x$ is an organometallic complex, L$_x$ is a phosphine ligand, and x is an integer in the range from 1 to 4; wherein the complex is anchored to the interior of a solid matrix with exterior surface and interior surface, and the solid matrix comprises a microporous material selected from the group consisting of Zeolite Y, Zeolite B, and ZSM-5 or a mesoporous material selected from the group consisting of MCM-41 and MCM-48.

2. A process for the preparation of an immobilized metal complex catalyst of Formula I

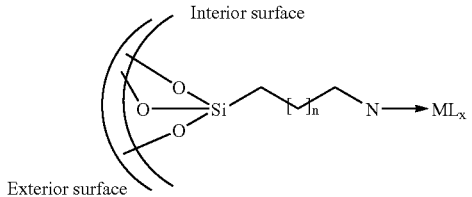

Formula I wherein M is a Group VIII metal, n is an integer in the range from 2 to 6, ML$_x$ is an organometallic complex, L$_x$ is a phosphine ligand, and x is an integer in the range from 1 to 4; wherein the complex is anchored to the interior of a solid matrix comprising a microporous material selected from the group consisting of Zeolite Y, Zeolite B, and ZSM-5 or a mesoporous material selected from the group consisting of MOM-41 and MCM-48; the process comprising pretreating a solid matrix with exterior surface and interior surface, by blocking the exterior surface using a blocking agent in a solvent system leaving the interior surface undisturbed;

functionalizing the interior surface of the solid matrix with a functionalized silane having a general formula of Z-$(CH_2)_p$—$Si(OR)_qH_{3-q}$, wherein Z is —$NH_2$, p is an integer in the range from 2 to 6, OR is an alkoxy group, and q is an integer in the range from 1 to 3; followed by treating the functionalized matrix with a transition metal complex solution of Formula II

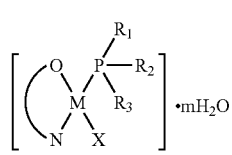

Formula II wherein M is a Group VIII metal; $R_1$, $R_2$, and $R_3$ are substituents on the phosphine ligand and are selected from the group consisting of hydrogen, alkyl, aWl, arylalkyl, and arylalkyl cycloaromatic group; X is selected from the group consisting of aryl sulphonato, alkyl suiphonato, aryl carbonate, alkyl carbonate, and formato, and a halide selected from the group consisting of Cl, Br, and I; N—O is a semilabile anionic chelating ligand containing an N donor and O⁻ group; 1<m<10; to immobilize the complex to the interior of the solid matrix, to obtain the immobilized metal complex catalyst.

3. A process as claimed in claim 2 wherein the solid matrix is siliceous or is aluminated (containing aluminium in the matrix framework).

4. A process as claimed in claim 2 wherein the blocking agent is selected from the group consisting of a dialkyl and a diaryl substituted dihalosilane having the general formula of $R_2SiX2$, wherein R is an alkyl, aryl, or arylalkyl group and X is a halogen atom selected from the group consisting of Cl, Br, and I.

5. A process as claimed in claim 2 wherein a solvent system used for the treatment of the matrix to block the exterior surfaces and subsequent functionalization is selected from the group consisting of dichloromethane, diethylether, dry methanol, dry ethanol, cyclohexane, cyclopentane, hexane, pentane and octane.

6. A process as claimed in claim 2 wherein in the transition metal complex of Formula II, N—O is selected from the group consisting of 8-hydroxyquinoline, 2-hydroxypyridine, 2-(2-hydroxyethyl) pyridyl-2-carboxylate, piperidyl-2-carboxylate, quinoly-2-carboxylate, isoquinoly-1-carboxylate, and isoquinolyl-3-carboxylate.

7. A process as claimed in claim 6 wherein N—O is pyridyl-2-carboxylate.

8. A process as claimed in claim 2 wherein in Formula II, M is Pd; $R_1$, $R_2$, and $R_3$ are phenyl; X is p-toluenesulphonato, N—O is pyridyl-2-carboxylate and m is 3.

9. A process as claimed in claim 2 wherein the anchoring of the metal complexes of Formula II is done in a solvent selected from the group consisting of methanol, ethanol, propanol, acetone and 2-butanone.

* * * * *